US008966493B1

(12) United States Patent
Richards et al.

(10) Patent No.: US 8,966,493 B1
(45) Date of Patent: Feb. 24, 2015

(54) MANAGING EXECUTION OF MULTIPLE REQUESTS IN A JOB USING OVERALL DEADLINE FOR THE JOB

(75) Inventors: Anita Richards, San Juan Capistrano, CA (US); Douglas P. Brown, Rancho Santa Fe, CA (US)

(73) Assignee: Teradata US, Inc., Dayton, OH (US)

(*) Notice: Subject to any disclaimer, the term of this patent is extended or adjusted under 35 U.S.C. 154(b) by 534 days.

(21) Appl. No.: 12/942,480

(22) Filed: Nov. 9, 2010

(51) Int. Cl.
*G06F 9/46* (2006.01)

(52) U.S. Cl.
USPC ........................................................ 718/104

(58) Field of Classification Search
CPC .................. G06F 17/30306; G06F 17/30477; G06F 17/30595
See application file for complete search history.

(56) References Cited

U.S. PATENT DOCUMENTS

| | | | |
|---|---|---|---|
| 5,301,317 A * | 4/1994 | Lohman et al. ........................ 1/1 |
| 5,473,773 A | 12/1995 | Aman | |
| 5,537,542 A | 7/1996 | Eilert | |
| 5,675,797 A | 10/1997 | Chung | |
| 6,052,694 A | 4/2000 | Bromberg | |
| 6,330,552 B1 * | 12/2001 | Farrar et al. .................... 705/400 |
| 6,718,358 B1 | 4/2004 | Bigus | |
| 6,950,848 B1 | 9/2005 | Yousefi'zadeh | |
| 7,146,353 B2 | 12/2006 | Garg | |
| 7,228,546 B1 | 6/2007 | McCarthy | |
| 7,379,953 B2 * | 5/2008 | Luo et al. ...................... 707/718 |
| 7,395,537 B1 | 7/2008 | Brown | |
| 7,657,501 B1 | 2/2010 | Brown | |
| 7,853,584 B2 * | 12/2010 | Barsness et al. .............. 707/719 |
| 2002/0184240 A1 * | 12/2002 | Volkoff et al. ................. 707/200 |
| 2003/0002649 A1 | 1/2003 | Hettish | |
| 2003/0005028 A1 | 1/2003 | Dritschler | |
| 2003/0233391 A1 | 12/2003 | Crawford, Jr. | |
| 2004/0021678 A1 | 2/2004 | Ullah | |
| 2004/0225631 A1 | 11/2004 | Elnaffar | |
| 2004/0236757 A1 | 11/2004 | Caccavale | |
| 2004/0243692 A1 | 12/2004 | Arnold | |
| 2005/0038789 A1 | 2/2005 | Chidambaran | |
| 2005/0038833 A1 | 2/2005 | Colrain | |
| 2005/0039183 A1 | 2/2005 | Romero | |
| 2005/0066326 A1 | 3/2005 | Herbeck | |
| 2005/0081210 A1 * | 4/2005 | Day et al. ....................... 718/104 |
| 2005/0125213 A1 | 6/2005 | Chen | |
| 2005/0192937 A1 * | 9/2005 | Barsness et al. ................... 707/3 |
| 2005/0262183 A1 | 11/2005 | Colrain | |
| 2006/0026179 A1 | 2/2006 | Brown | |
| 2006/0080285 A1 * | 4/2006 | Chowdhuri ....................... 707/3 |
| 2007/0100793 A1 | 5/2007 | Brown | |
| 2007/0162426 A1 | 7/2007 | Brown | |
| 2007/0271570 A1 * | 11/2007 | Brown et al. ................. 718/105 |

(Continued)

OTHER PUBLICATIONS

Beyer et al., "Protecting the Quality of Service of Existing Information Systems", Computer Sciences Department, University of Wisconsin, 2003, pp. 1-10.

(Continued)

*Primary Examiner* — Meng An
*Assistant Examiner* — James J Lee
(74) *Attorney, Agent, or Firm* — Trop, Pruner & Hu, P.C.; Ramin Mahboubian

(57) ABSTRACT

A database system receives information relating to a job requested by a requestor, where the job includes a plurality of requests. Execution of the requests of the job is managed using the received information, where managing the requests includes adjusting one or more of priority settings and resource estimates for the requests.

17 Claims, 5 Drawing Sheets

(56) References Cited

U.S. PATENT DOCUMENTS

| | | | |
|---|---|---|---|
| 2008/0052720 A1* | 2/2008 | Barsness et al. | 718/104 |
| 2008/0092142 A1* | 4/2008 | Tran et al. | 718/105 |
| 2008/0162417 A1 | 7/2008 | Morris | |
| 2008/0162418 A1 | 7/2008 | Morris | |
| 2008/0162419 A1 | 7/2008 | Brown | |
| 2008/0162583 A1 | 7/2008 | Brown | |
| 2008/0172419 A1 | 7/2008 | Richards | |
| 2011/0231457 A1* | 9/2011 | Tager et al. | 707/825 |

OTHER PUBLICATIONS

Nikolaou et al., "Transaction Routing for Distributed OLTP Systems: Survey and Recent Results", Department of Computer Science, University of Crete and Institute of Computer Science, 2002, pp. 1-26.

Sinnwell et al., "Managing Distributed Memory to Meet Multiclass Workload Response Time Goals", Department of Computer Science, University of the Saarland, 2002, pp. 1-8.

Oracle, "Oracle9i Database Resoruce Manager", Technical Whitepaper, 2001, pp. 1-11.

Finkelstein, Computer Science Department, Stanford University, "Common Expression Analysis in Database Applications," 1982, pp. 235-245.

Sellis, University of California, Berkeley, "Multiple-Query Optimization," ACM Transactions on Database Systems, vol. 13, No. 1, Mar. 1988, pp. 23-52.

Brown et al., U.S. Appl. No. 12/317,836 entitled "Database System Having a Service Level Goal Responsive Regulator" filed Dec. 30, 2008 (24 pages).

Brown et al., U.S. Appl. No. 12/317,985 entitled "Database System Having Regulator That Performs Workload Regulation Based on Optimizer Estimates" filed Dec. 30, 2008 (26 pages).

Brown et al., U.S. Appl. No. 12/482,780 entitled "Database System Having a Regulator to Provide Feedback Statistics to an Optimizer" filed Jun. 11, 2009 (33 pages).

Burger et al., U.S. Appl. No. 12/908,052 entitled "Generating an Integrated Execution Plan for Multiple Database Requests" filed Oct. 20, 2010 (34 pages).

Brown et al., U.S. Appl. No. 12/942,466 entitled "Adjusting a Resource Estimate in Response to Progress of Execution of a Request" filed Nov. 9, 2010 (36 pages).

\* cited by examiner

MANAGING EXECUTION OF MULTIPLE REQUESTS IN A JOB USING OVERALL DEADLINE FOR THE JOB

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

As database systems have increased in size and complexity, it has become more challenging to efficiently implement operational and management tasks in the database systems.

SUMMARY

In general, according to some embodiments, a database system receives information relating to a job requested by a requestor, where the job includes a plurality of requests. Execution of the requests of the job is managed using the received information, wherein managing the requests includes adjusting one or more of priority settings and resource estimates for the requests.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
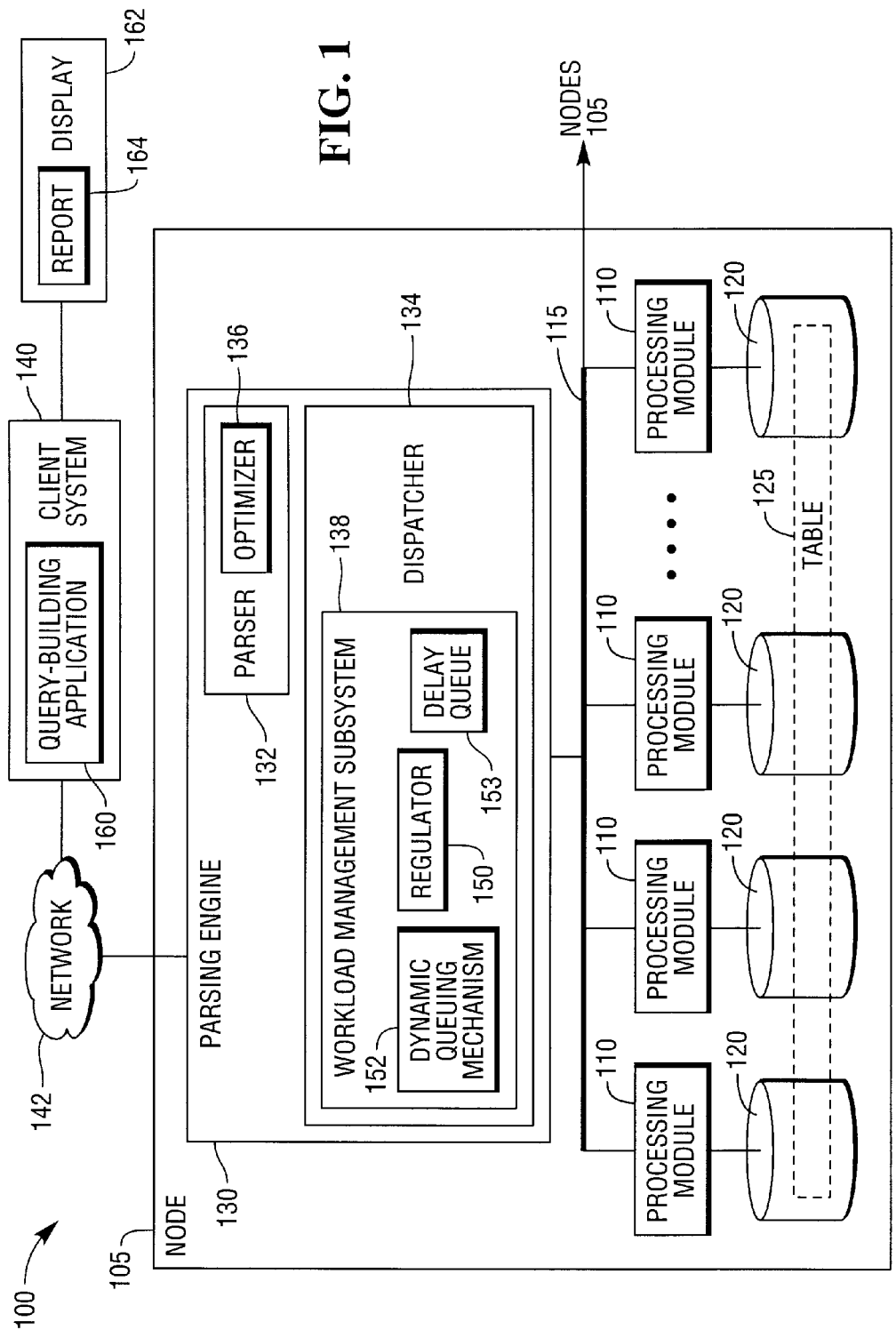
FIG. 1 is a block diagram of an example database system including a workload management subsystem in accordance with some embodiments.

Typical database management systems (or more simply, "database systems") manage execution of requests by focusing on the individual requests and whether the requests will meet their respective individual performance goals. However, in many cases, a series of requests can be submitted that relate to a particular job. A "job" can refer to some discrete piece of work that can be made up of multiple requests. An example of a job is the generation of a report that is requested by a user, where the report is produced by accessing data stored in the database system using a number of different requests. From the user's perspective, the focus is on the response time of the overall job, and not on response times of individual requests included in the job. For example, a user may wish to have a report generated by a particular time, such as by the end of the week. Consequently, from the user's perspective, it does not matter whether individual requests satisfy their respective individual performance goals, so long as the overall job is completed by the target deadline.

The term "request" or "database request" can refer to a database query (e.g., Structured Query Language or SQL query) that is processed by the database system to produce an output result. Alternatively, a "request" or "database request" can refer to a utility, such as a load utility to perform loading of data from a source to a target. More generally, a "request" or "database request" refers to any command or group of commands that can be submitted to the database system for performing predefined data access (read or write) tasks, or to perform creation or modifications of database structures such as tables, views, etc.

A typical database system that manages individual requests to the respective individual performance goals of the requests is not aware of other requests that can be related (part of the same job) to a particular request that is currently running. As a result, the typical database system would not be able to determine whether or not an overall deadline for the job can be met.

In accordance with some embodiments, a workload management subsystem of a database system is able to manage execution of requests of a job using information relating to the job, such that an overall performance goal of the job can be achieved. For example, the information relating to the job can include an overall deadline for the job. Other types of information can also be provided to the management subsystem (as further discussed below). By considering information relating to the overall job, the management subsystem is able to ensure that any overall deadline associated with the job can be met.

The workload management subsystem can adjust one or more of priority settings of requests of the job and/or resource estimates for the requests of the job to ensure that the overall deadline for the job can be met. Adjusting a priority setting of a request refers to changing a priority of the request (increasing the priority would lead to the request being executed ahead of other requests competing for database system resources, whereas decreasing the priority would lead to the request being executed behind other requests competing for database system resources). Adjusting resource estimates refers to changing an amount of resources of the database system estimated to be consumed by the request—varying the resource estimates can cause the workload management subsystem in the database system to control priority settings for the request accordingly. For example, based on the updated resource estimates, the workload management subsystem can determine that the current priority setting for the request is sufficient (or insufficient as the case may be) to satisfy a target performance goal.

Another benefit of knowing the overall deadline for the job is that the deadline for the job can be a time that is far away in the future. If the workload management subsystem is aware of such a far-away deadline, the workload management subsystem can decide to throttle the requests associated with the job (by parking such requests in a delay queue, for example) so that these requests do not take up valuable resources of the database system. As a result, the database system can more efficiently process other requests that may need more attention at the present time.

FIG. 1 shows an example arrangement that includes a database system 100 coupled over a data network 142 to a client system 140 (which can be a computer, personal digital assistant, etc.). As shown in the example of FIG. 1, the client system 140 includes a query-building application 160 that can generate a series of requests relating to a job requested by a user of the client system 140. For example, the job can include generation of a report 164 requested by the user. In other examples, other types of jobs each having multiple requests can be requested by the user.

The report 164 can be displayed by a display device 162 connected to the client system 140. Alternatively, the report 164 can be sent to a remote device.

The query-building application 160 submits requests relating to a particular job to the database system 100 over the data network 142. Although the query-building application 160 is depicted as executing in the client system 140, the query-building application 160 can execute in the database system 100 in other examples.

In some implementations, the database system 100 can be implemented with multiple computer nodes 105 (just one node depicted in FIG. 1). Each node 105 includes one or more processing modules 110 connected to a network 115. The processing modules 110 manage the storage and retrieval of data in respective data storage facilities 120. Each of the processing modules 110 may be one or more physical processors or may be a virtual processor, with one or more virtual processors running on one or more physical processors.

Each processing module 110 manages a portion of a database that is stored in a corresponding one of the data storage facilities 120. Each data storage facility 120 includes one or more disk drives or other types of storage devices. The nodes 105 of the database system are interconnected by the network 115.

As depicted in FIG. 1, a table 125 is distributed across the data storage facilities 120, where different rows of the table 125 can be distributed across the data storage facilities. In response to a request, one or more of the processing modules 110 can be instructed to retrieve corresponding rows from the table 125 to provide a result to the querying client (which can be one of the client systems 140).

The node 105 also includes a parsing engine 130, which has a parser 132 and a dispatcher 134. The parser 132 receives database requests (such as those submitted by the query-building application 160 over the network 142 or by another source), parses each received request, and generates executable steps for the parsed query. The parser 132 includes an optimizer 136 that generates query plans (also referred to as execution plans) in response to a request, selecting the most efficient from among the plural query plans. The optimizer 136 can also produce resource estimates (e.g., time estimates or estimates of usage of various database system resources) for the query plan.

The dispatcher 134 sends the executable steps of the query plan generated by the parser 132 to one or multiple processing modules 110 in the node 105. The processing module(s) 110 execute(s) the steps. If the request specifies retrieval of data from the table 125, then the retrieved data is sent back by the database system 100 to the querying client system 140 for storage or display at the client system 140. Alternatively, the request can specify a modification of the table 125 (adding data, changing data, and/or deleting data in the table).

The dispatcher 134 includes a workload management subsystem 138 according to some embodiments. Note that parts of the workload management subsystem 138 can also be in the processing modules 110 (not depicted), since the workload management subsystem 138 also monitors execution of requests, as discussed below.

In embodiments with multiple parsing engines 130, each parsing engine can have a corresponding parser and/or workload management subsystem.

The workload management subsystem 138 includes a regulator 150, a dynamic queuing mechanism 152, and a delay queue 153 (or alternatively, multiple delay queues). The regulator 150 is used to regulate execution of a request by monitoring its progress during execution and adjusting priority settings of the request as needed to ensure that the request meets a target performance goal, such as a service level goal (SLG). An 'SLG' or "service level goal" refers to a predefined set of one or more performance criteria that are to be satisfied during execution of a request. The SLG can be defined by a database administrator, for example. In some examples, an SLG can be any one or more of the following: a target response time; a target throughput; an enforcement policy (to specify that some percentage of queries are to finish in some predefined amount of time), and so forth. In a more specific example, the SLG for requests of a particular workload group can be "≤1 second @ 95," which means that each such request should execute within one second 95% of the time. Another example SLG can be "1,000 queries per hour."

The dynamic queuing mechanism 152 controls the queuing of requests that cannot be scheduled for execution immediately in the delay queue 153. In accordance with some implementations, the dynamic queuing mechanism 152 also controls the prioritization of requests in the delay queue 153 for scheduling an order in which requests in the delay queue 153 are to be executed. In some examples, the scheduling technique used by the dynamic queuing mechanism 152 for the delay queue 153 is a first-in first-out (FIFO) scheduling technique, in which a request in the delay queue 153 is scheduled for execution in a first-in, first-out manner. Alternatively, the dynamic queuing mechanism 152 can calculate priority indicators for the requests in the delay queue 153, where the priority indicator is calculated for a request in the delay queue 153 can be based on delay times and predefined priority levels set for respective requests in the delay queue 153. The ordering of requests in the delay queue 153 according to the priority indicators is designed to ensure that the requests in the delay queue 153 are scheduled for execution in an order that increases the likelihood that requests are able to meet their respective SLGs. Alternatively, a predefined priority level can be a deterministic level that specifies a relative share of database system resources to be used by the corresponding request.

Figure 2:
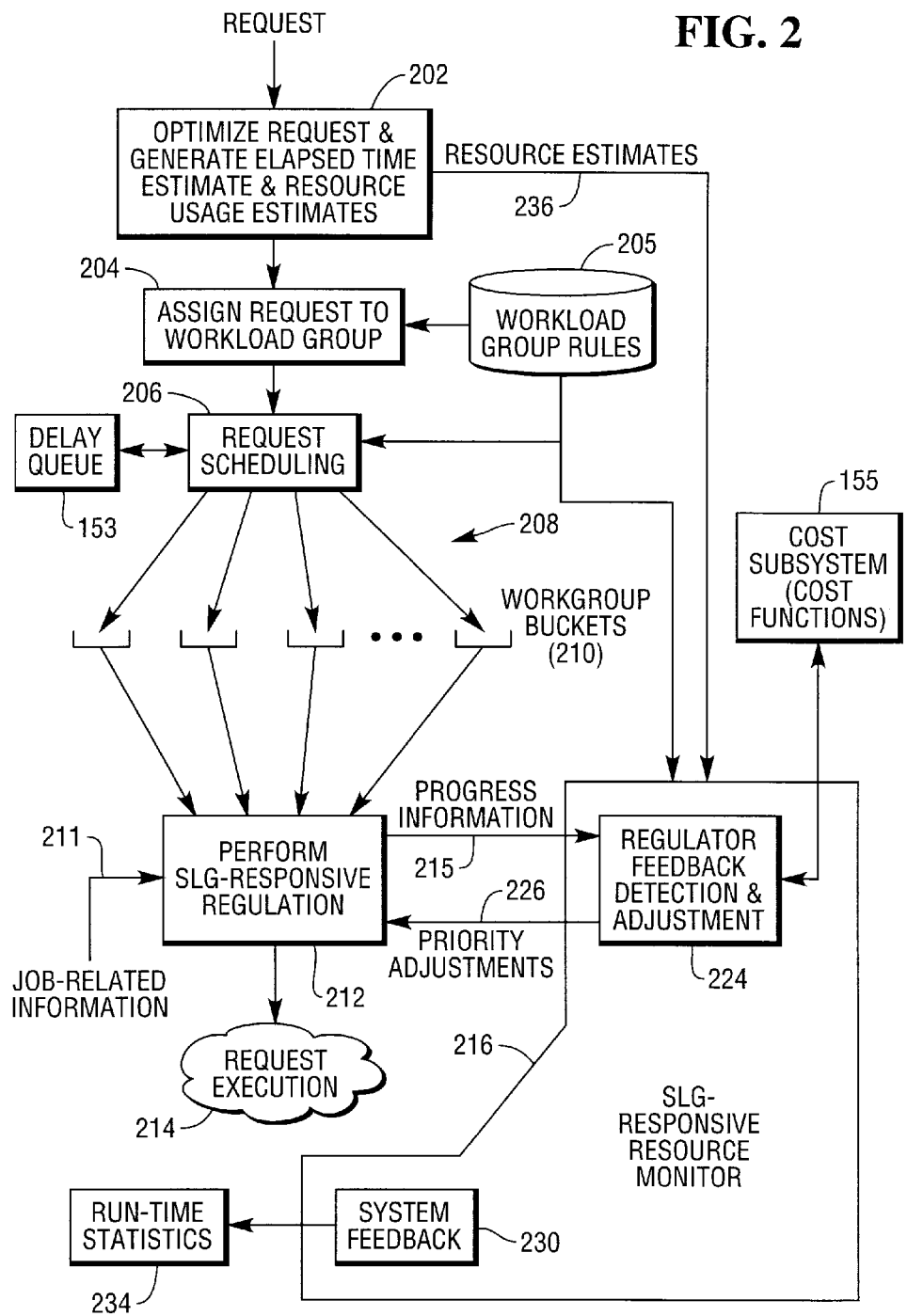
FIG. 2 illustrates an architecture for regulating workloads, in accordance with some embodiments.

Operation of the optimizer 136 and workload management subsystem 138 is illustrated in more detail in FIG. 2. The database system's operation has several major phases: (1) assigning incoming requests to workload groups, (2) performing dynamic scheduling to determine whether incoming requests can be scheduled for immediate execution or whether certain incoming requests are provided into the delay queue 153 for later execution; (3) monitoring the execution of the workload groups against SLGs (if applicable); and (4) regulating (adjusting and managing) the workload flow and priorities to achieve SLGs (if applicable).

A "workload group" (or alternatively "workload") is a set of requests that have common characteristics, such as an application that issued the requests, a source of the requests, type of query, priority, response time goals, throughput, and so forth. A workload group is defined by a workload definition, which defines characteristics of the workload group as well as various rules associated with the workload group.

The workload groups may be divided into workload groups of different priorities. A low priority workload group may include low priority requests such as background load requests or reporting requests. Another type of workload group includes requests that have short durations but high priorities. Yet another type of workload group includes continuous or batch requests, which run for a relatively long time.

Note that a workload group differs from a job requested by a user. A job includes a series or group of requests to be executed to achieve a particular desired result, such as generation of a report. A workload group includes a set of requests that share a common characteristic (or multiple common characteristics).

As depicted in FIG. 2, an incoming request is optimized (at 202) by the optimizer 136. In generating query plans and selecting an optimal one of the query plans for submission to the processing modules 110 for execution, the optimizer 136 can generate an estimate of the response time (elapsed time) that provides an indication of how long the request should execute in the database system. Note that estimates can also be generated for every individual step of the request, and a sum of the estimates for the individual steps provides the estimate of the entire request. Moreover, in accordance with some embodiments, the optimizer 136 can generate other resource estimates, including estimates of processor usage, input/output (I/O) resource usage, and network resource usage, for each step of the request. An I/O resource can be a physical I/O resource (e.g., megabits per second for a physical storage device) or a logical I/O resource (e.g., logical blocks per second, where a logical block refers to some predefined amount of data used by a data access subsystem such as a file system and the like).

The optimizer 136 can produce the estimates of processor usage, I/O resource usage, and network resource usage based on a cost model. For example, the optimizer 136 can retrieve information relating to the processor capacity, which can be expressed in terms of millions of instructions per second (MIPS). Also, the optimizer 136, as part of its normal optimization tasks, can estimate the cardinalities of tables and intermediate spool files that are involved in execution of the request. Based on the estimated cardinalities and the processor capacity, the optimizer 136 is able to estimate the processor usage that is expected for execution of the request. The processor usage estimate can be performed on a per-step basis for each step of the query plan. Note that different steps can access different tables or different parts of tables across different access modules in the system.

Similarly, the optimizer 136 can also retrieve information regarding memory size (size of high-speed memory that can be used to temporarily store data). Based on the memory size and the expected accesses of data in base tables and intermediate tables that will be involved in each step of a query plan, the optimizer 136 is able to estimate the expected I/O usage for each step. The I/O usage includes I/O accesses of disk storage (e.g., the number of block I/Os to read from or write to a table or index).

Moreover, the optimizer 136 is able to determine which data-storage facilities 120 store data involved in the execution of the request. For each step of the query plan, the optimizer 136 is able to estimate how much inter-processor module or inter-node traffic is expected—this will allow the optimizer 136 to estimate the network usage (usage of the network 115 of FIG. 1) is expected for each step.

Based on the resource estimates (response time estimate and/or processor usage, I/O usage, network usage, table cardinality and/or spool size estimates), and/or based on other classification criteria for a respective workload, the workload management subsystem 138 assigns (at 204) the incoming request to one of the multiple workload groups that have been defined. The assignment is based on accessing workload group rules 205 (as defined by workload definitions) to match characteristics of the request as identified by the optimizer 136 with various workload definition rules. The workload group corresponding to the workload definition rules most closely matching the characteristics of the request is identified, where the incoming request is assigned to the identified workload group.

Next, the regulator 150 performs request scheduling (at 206), where the regulator 150 determines whether or not an incoming request is to be immediately scheduled for execution or whether the incoming request should be held for later execution. As part of the request scheduling performed at 206, the regulator 150 can consider concurrency limits—the maximum number of concurrent executing requests from each workload group. The regulator 150 monitors the concurrency limits of the workload groups, and if the concurrency limit of the corresponding workload group (that the incoming request is assigned to) is above a predefined threshold (which means that there are too many concurrent executing requests for this workload group), then the incoming request for that workload group waits in the delay queue 153 for later execution until the concurrency level for this workload group subsides below the defined threshold.

In accordance with some embodiments, in deciding as part of the request scheduling (206) regarding whether or not to schedule the incoming request for immediate execution or to park the incoming request in the delay queue 153, the regulator 150 can also consider information relating to overall job (that the incoming request is part of). The considered information can include the overall deadline of the job.

Using the deadline to make the foregoing decision is part of a process to perform deadline-sensitive throttling. Requests that are not due for a long time relative to their resource needs (based on the deadline of the job) will yield a relatively low resource estimate. For example, a calculated resource estimate based on the far-away deadline may yield a need for less than 0.001% of the CPU. In this case, overall workload management of the database system can be enhanced by parking the incoming request in the delay queue 153, rather than starting the incoming request with a low resource estimate. In this way, the parked request for the job does not hold onto shared resources, which can be used by other requests with a greater need for the shared resources. As time progresses, the calculated resource estimate naturally increases (because there is less available time until the deadline for the job is reached), which dictates an appropriate time to release the request from the delay queue 153. For example, release of a request from the delay queue 153 can occur if the request needs some predefined threshold of a resource (e.g., 0.1% or more of the CPU).

If an incoming request can be scheduled for execution (either immediately or as released from the delay queue 153), the regulator 150 places (at 208) the incoming request into one of multiple workload group buckets 210 (as defined by corresponding workload definitions). The "buckets" 210 can be execution queues that contain requests scheduled for execution.

Next, the regulator 150 performs SLG-responsive regulation (at 212) at the request level. The regulator 150 selects a request from one of the buckets 210, in an order determined by priorities associated with the workload groups, and executes (214) the selected request.

In accordance with some embodiments, the SLG-responsive regulation task 212 performed by the regulator 150 includes recalibrating resource estimates, as well as adjusting priority settings for an individual request based on the recalibrated resource estimates in an attempt to meet the SLG associated with the request. Recalibration of resource estimates can be provided by cost functions of a cost subsystem 155.

The regulator 150 according to some embodiments receives initial resource estimates from the optimizer 136 for each request. To allow for the adjustment of resource estimates (on a continual basis), the costs functions of the cost subsystem 155 can be invoked by the regulator 150 adjust resource estimates during execution of various steps of an execution plan corresponding to the request.

To allow for regulation of execution of requests according to information relating to an overall job (rather than just based on SLGs of individual requests), the regulator 150 also receives information 211 related to the job. This information can be provided by the requestor of the job, such as the query-building application 160 shown in FIG. 1. The job-related information 211 can include one or more of the following pieces of information: the overall deadline of the job; the number of units of work in the job and the number of requests within each of the units of work (where a "unit of work" refers to an identifiable segment of the overall job that is made up of one or more requests); a sequence number of the unit of work within the job and/or the sequence number of a request within a unit of work (where the sequence number identifies where in a sequence of units of work or a sequence of requests a current active unit of work or request is located); a predicted percentage of the overall job associated with a unit of work; a predicted percentage of a respective unit of work or of the overall job associated with a particular request; time lost due to various factors, such as network delays, middle tier delays, and so forth; and other information.

Although the foregoing assumes that the job is divided into units of work, which in turn are divided into requests, it is noted that in alternative implementations, a job can simply be considered to be made up of a series of requests.

If the deadline of the overall job is provided, then the regulator 150 will manage execution of the request of the job such that the overall deadline of the job can be met. Alternatively, if the regulator 150 is provided with an overall deadline of the job and the number of requests that can be expected for a job, then the regulator 150, during execution of a particular request, will know how many more requests are expected for a job and thus can manage execution of the particular request to meet the overall job deadline. For example, if information relating to a job indicates that the job has five requests, and the regulator 150 receives an estimate from the optimizer 136 that the first request will consume an estimated time of 100 seconds, then the regulator 150 can predict that the overall job will consume 500 seconds (five requests multiplied by 100 seconds based on the optimizer's estimate for the first request).

It is also possible that the requestor (such as the query-building application 160) can provide further information, such as a request's predicted percentage of work within the overall job. Thus, in the foregoing example where the job has five requests, and the request is estimated to have an execution time of 100 seconds, if the requestor provided an estimate that the first request represents about 10% of the overall job's processing, then the regulator 150 can use that percentage value to derive an estimate of a total of 1000 seconds for the job (100 seconds estimated processing time for the first request divided by 10%).

Alternatively, a hybrid approach can also be provided, in which the job is divided into units of work and each unit of work is divided into one or more requests. As noted above, information can be provided for both units of work and the requests, which can be used by the regulator 150 to regulate execution of requests associated with the job. In one specific example, a job has five units of work, and the first of the five units of work represents about 10% of the overall job of processing. The first unit of work also includes four requests, and the first request of the first unit of work has an estimated processing time (provided by the optimizer 136) of 25 seconds. Based on this information, the estimated overall job processing time would be 25 seconds*4/10%=1000 seconds (time estimated for a request multiplied by the number of requests per unit over work, divided by the estimated percentage of the overall job's processing attributable to the unit of work).

The effectiveness of the regulator 150 in managing execution of requests of a job to meet a performance goal (e.g., deadline) of the job can vary based on the amount of information provided by the requestor to the regulator 150. Providing more detail from the requestor to the regulator 150 allows the regulator 150 to compute more accurate estimates when managing execution of the requests of the job. Less detail from the requestor would lead to the regulator 150 making certain assumptions, such as assuming that all requests of the job have equal execution times (which may or may not be correct).

Figure 3A:
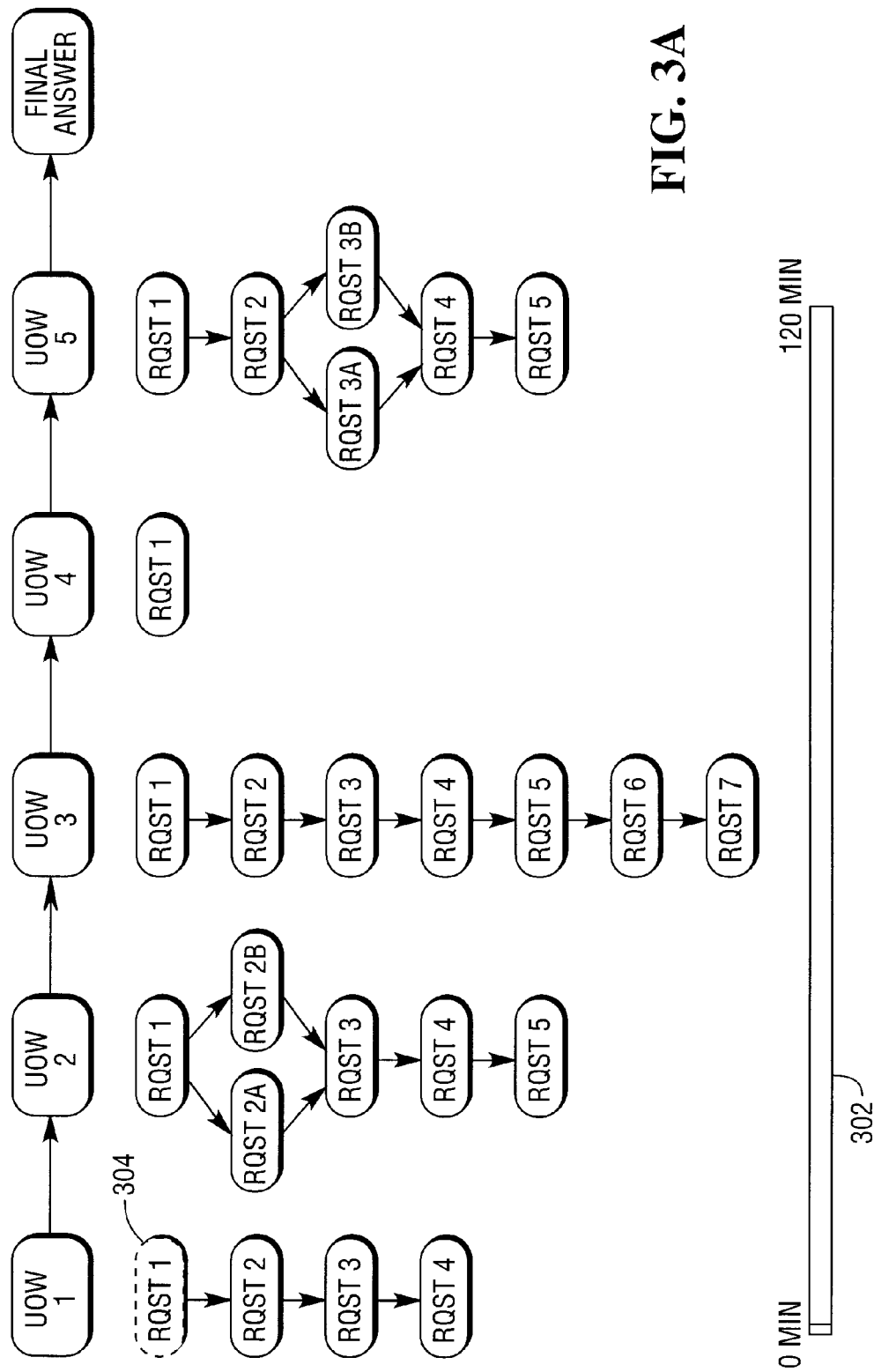
FIGS. 3A-3B are timing diagrams illustrating processing of requests of a job according to some embodiments.
Figure 3B:
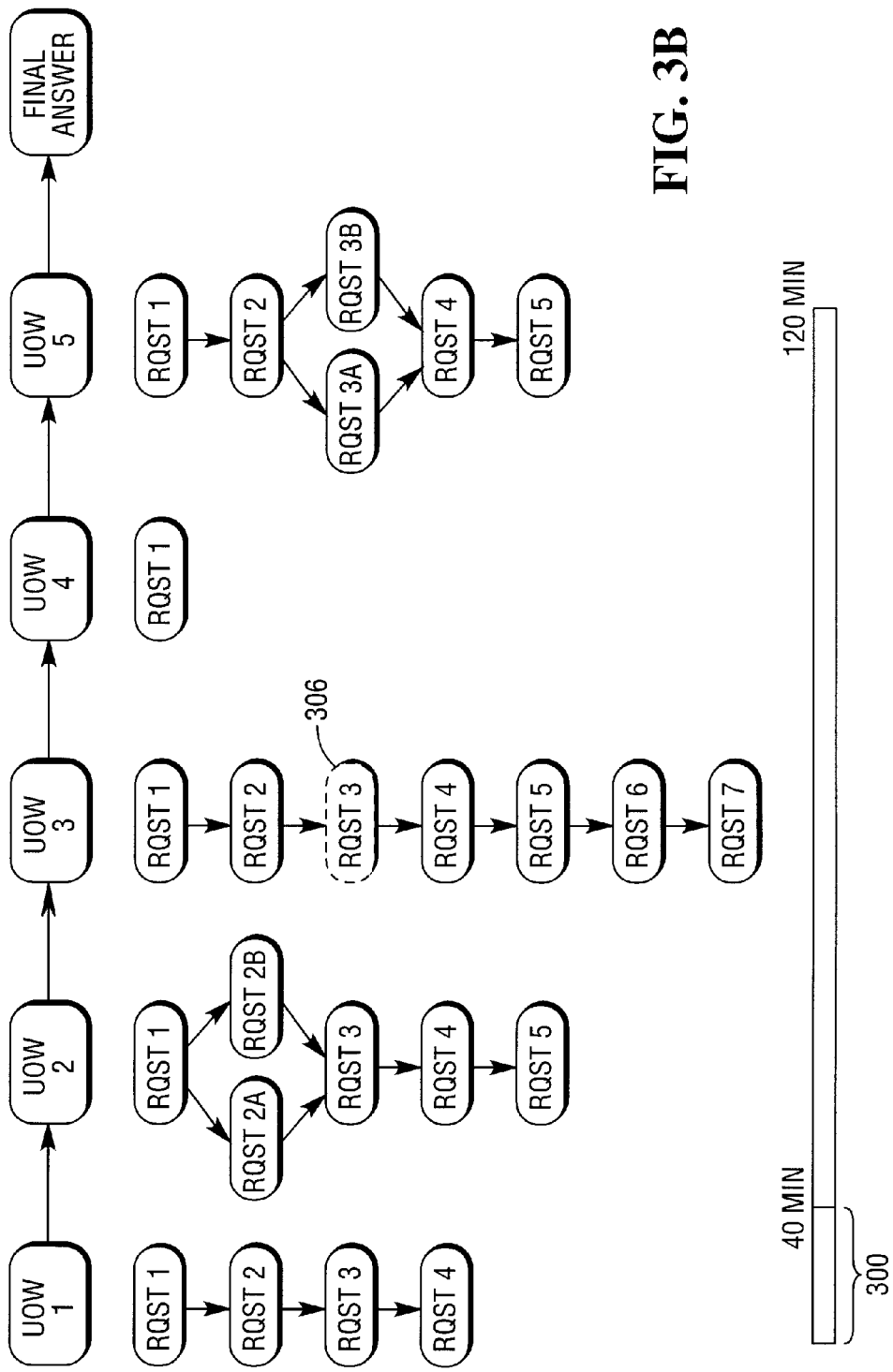

FIGS. 3A-3B illustrate an example of a job that is divided into units of work which are further divided into requests. As shown in FIG. 3A, the overall deadline for the job is 120 minutes, as represented by bar 302. The job has five units of work (UOW1, UOW2, UOW3, UOW4, and UOW5). The output of UOW5 is the final answer for the job sought by the user.

Each unit of work has its respective set of requests, as represented by "Rqst" blocks in FIG. 3A underneath each respective unit of work. For example, the unit of work UOW1 has four requests, while the unit of work UOW2 has six requests.

At the beginning of execution of the job represented by FIG. 3A, where the first request (304) of UOW1 is being executed, the regulator 150 is provided with the following information from the requestor, such as the query-building application 160. UOW1 is estimated to represent 10% of the overall job's processing, and UOW1 has four requests. The first request in UOW1 has an estimated processing time of 25 seconds. As a result, the overall job processing time is 25 seconds*4/10%=1000 seconds. The estimated resource estimate to complete the job in 120 minutes (or 7200 seconds) (represented by bar 302 in FIG. 3A) is 1000/7200=1.4 CPU sec/sec. 1.4 CPU sec/sec represents an estimate of the CPU resource that is to be consumed by the requests of the job to meet the deadline of 120 minutes for the job.

Later, during execution of the job, the third request (306) of UOW3 is reached, as depicted in FIG. 3B. At this time, further information is received from the requestor, which can indicate that UOW3 represents about 30% of the total job's processing, and UOW3 has seven requests, with five more requests to be executed starting with the third request (306). The third request (306) is estimated to have an execution time of 100 seconds. Based on this information, the estimated overall job processing time is 100 seconds*5/30%=1667 seconds. Execution of the job up to the third request of UOW3 has consumed 40 minutes, as represented by bar segment 300 in FIG. 3B. Thus, the regulator 150 knows that it has 80 minutes left to meet the deadline for the job (120 minutes). The resource estimate to be allocated to the remaining requests of the job to complete the remainder of the job in 80 minutes (4800 seconds) is calculated as follows: 1667/4800=0.35 CPU sec/sec. Note that the CPU estimate based on information for the third request of UOW3 is less than the original CPU estimate based on information for the first request (304) of UOW1.

Thus, it can be seen that based on the overall deadline of the job, the regulator 150 is able to adjust resource estimates appropriately to ensure that the job meets its deadline. The adjustment of the resources can be an increase or decrease in the resource estimates.

As further depicted in FIG. 2, the workload management subsystem 138 includes an SLG-responsive resource monitor 216, which includes a regulator feedback detection and adjustment module 224 that interacts with the cost subsystem 152. As further depicted in FIG. 2, the SLG-responsive resource monitor 216 also includes a system feedback module 230 that provides run-time statistics 234 as feedback.

The regulator feedback detection and adjustment module 224 of the SLG-responsive resource monitor 216 performs feedback detection and dynamic resource adjustment. The module 224 receives progress information (215) from the SLG-response regulation task 212, where the progress information 215 is reported based on monitoring execution of the request.

The regulator feedback and detection adjustment module 224 and the cost subsystem 152 are able to consider, at each step of the query plan associated with the request, whether the progress information for execution of the request so far that is received from the SLG-responsive regulation task 212 is consistent with the current resource estimates provided for the respective steps of the query plan. The progress information 215 can indicate whether or not the current resource estimates are inadequate (actual usage exceeds estimated resource usage) or excessive (actual usage less than estimated resource usage). The progress information 215 can indicate that the current resource estimates are insufficient to meet the overall deadline of the job, for example. If recalibration of resource estimates is needed based on comparing the progress information 215 to the current resource estimates, selected ones of the cost functions of the cost subsystem 152 can be invoked to recalibrate respective resource estimates, such as a first cost function to recalibrate a time estimate, a second cost function to recalibrate a processor usage estimate, a third cost function to recalibrate an I/O usage estimate, and so forth. In some examples, at the end of each step in a query plan, the cost functions of the cost subsystem 152 can be invoked to adjust resource estimates for remaining steps of the query plan to reflect the actual budget (actual usage of resources) at run-time. In this way, any inaccuracies in resource estimates can be dynamically re-calibrated during execution of steps of the query plan.

Figure 4:
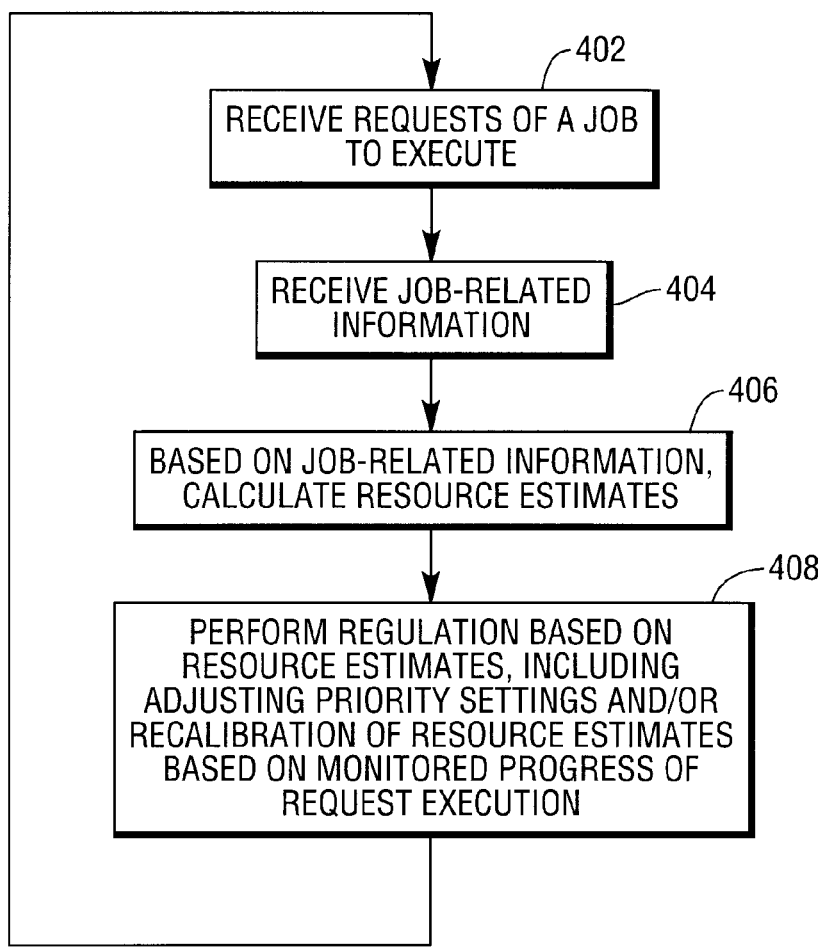
FIG. 4 is a flow diagram of a regulation procedure according to some embodiments.

FIG. 4 is a flow diagram of a process performed by the workload management subsystem 138 according to some implementations. Requests of a job are received (at 402). In addition, information relating to the job is received (at 404) from the requestor, such as the query-building application 160 of FIG. 1.

Based on the job-related information, resource estimates are calculated (at 406) by the regulator 150. Workload regulation is then performed (at 408) by the regulator 150 based on the resource estimates, including tasks represented by 212 and 216 depicted in FIG. 2. The workload regulation includes adjusting priority settings of the requests of the job and/or recalibration of resource estimates in response to the monitored progress information (215) depicted in FIG. 2.

As further shown in FIG. 4, the process repeats (410), as further requests of the job are received and as further job-related information is received.

Using mechanisms or techniques according to some embodiments, improved workload management for requests of a particular job can be accomplished, where the workload management takes into account information related to the job provided by the requestor that provided the requests for the job. Taking account job-related information as part of the workload management increases the likelihood that any overall deadline associated with the job will be met as a result of executing requests of the job. The regulator of the workload management subsystem can use the job-related information provided by the requestor to perform such workload regulation, without requiring that the database system separately maintain knowledge regarding requests that make up the job.

Instructions of machine-readable instructions, including various modules depicted in FIGS. 1 and 2 are loaded for execution on a processor. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method for use in a database system, comprising:
   receiving, by a regulator executing on at least one processor from a requestor, an overall objective including an overall deadline for a job requested by the requestor, wherein the job includes a plurality of requests having similar workload;
   managing, by the regulator, the overall objective for execution of the requests of the job as a whole, wherein the managing comprises adjusting one or more of priority settings of the requests and resource estimates for the requests in order to meet the overall objective for the execution of the requests of the job as a whole, wherein the managing of the overall objective for execution of the requests of the job as a whole further comprises:
   at a first stage of the job,
      receiving, by the regulator from an optimizer, a resource estimate for a particular one of the plurality of requests;
      predicting, by the regulator, resource estimates of remaining requests of the plurality of requests based on the received resource estimate;
      monitoring, by the regulator, execution of the particular one of the plurality of requests for actual consumption of resource; and at a subsequent stage of the job, adjusting, by the regulator, the resource estimates of the remaining requests based on comparing the actual consumption of the resource by the particular one of the plurality of requests with the received resource estimate from the optimizer and determining that the resource estimates of the remaining requests are insufficient to meet the overall deadline of the job.

2. The method of claim 1, wherein the information relating to the job comprises an overall deadline for the job, wherein managing the execution of the requests of the job comprising managing the execution of the requests to meet the overall deadline.

3. The method of claim 2, wherein the information relating to the job further comprises an indication of a number of requests in the job.

4. The method of claim 3, wherein the information further comprises an indication of a percentage of the job that a currently active one of the requests of the job makes up, the method further comprising:
    calculating, using the indication of the percentage, on overall execution time for the job based on the number of requests in the job.

5. The method of claim 2, wherein the information relating to the job further comprises indications of a number of units of work in the job, and a number of requests in each of the units of work.

6. The method of claim 5, wherein the information further comprises an indication of a percentage of the job that a currently active one of the units of work makes up, the method further comprising:
    calculating, using the indication of the percentage, an overall execution time for the job based on the number of units of work in the job.

7. The method of claim 1, wherein the received resource estimate for the particular request at the first stage is based on first information relating to the job from the requestor, and wherein adjusting the resource estimates for the job at the second stage is based on second, different information relating to the job from the requestor.

8. The method of claim 7, wherein the first information includes an estimated processing time for a first request in the first stage, and the second information includes an estimated processing time for a second request in the second stage.

9. A database system comprising:
    a storage media to store data accessible by a requestor; and
    at least one processor configured to:
    receive, from the requestor, information relating to a job to be performed by the requestor, wherein the job includes a plurality of requests having similar workload, and the information includes an overall deadline for the job; and
    manage execution of the requests of the job as a whole using the overall deadline for the job, wherein the management of the execution of the requests comprises adjusting one or more of priority settings of the requests and resource estimates for the requests in order to meet the overall deadline for the execution of the requests of the job as a whole, wherein the at least one processor is further configured to manage the execution of the requests of the job as a whole by:
    at a first stage of the job,
        receive, from an optimizer, a resource estimate for a particular one of the plurality of requests;
        predict resource estimates of remaining requests of the plurality of requests based on the received resource estimate;
        monitor execution of the particular one of the plurality of requests for actual consumption of resource; and
    at a subsequent stage of the job, adjust the resource estimates of the remaining requests based on comparing the actual consumption of the resource by the particular one of the plurality of requests with the received resource estimate from the optimizer and determining that the resource estimates of the remaining requests are insufficient to meet the overall deadline of the job.

10. The database system of claim 9, wherein the management of the execution of the requests further comprises performing throttling of the requests based on the overall deadline, wherein the throttling includes delaying execution of the requests by placing the requests into a delay queue.

11. The database system of claim 10, wherein the management of the execution of the requests further comprises:
    releasing selected ones of the requests from the delay queue as the overall deadline approaches.

12. The database system of claim 9, wherein the resource estimates are selected from the group consisting of a time estimate, an estimate of usage of a processor resource, an estimate of usage of an input/output resource, and an estimate of usage of a network resource.

13. The database system of claim 12, wherein the estimate of usage of the processor resource comprises an estimate of usage of one or more central processing units (CPUs) provided in one or more computer nodes of the database system, wherein the estimate of usage of the input/output resource comprises an estimate of a number of accesses of a disk-based storage, and the estimate of usage of the network resource comprises an estimate of an amount of data to be communicated over a network between processing modules of the database system.

14. The database system of claim 9, wherein adjusting the resource estimates comprises:
    increasing the resource estimates in response to determining that actual consumption of resources is greater than the resource estimates; and
    decreasing the resource estimates in response to determining that actual consumption of the resources is less than the resource estimates.

15. The database system of claim 9, wherein the information relating to the job further comprises an indication of a number of requests in the job.

16. The database system of claim 9, wherein the information relating to the job further comprises indications of a number of units of work in the job, and a number of requests in each of the units of work.

17. An article comprising at least one non-transitory computer-readable storage medium storing instructions that upon execution cause a database system having a processor to:
    receive information relating to a job requested by a requestor, wherein the job includes a plurality of requests having similar workload, and the information includes an overall deadline for the job; and
    manage execution of the requests of the job as a whole using the received information, wherein managing the requests comprises adjusting one or more of priority settings of the requests and resource estimates for the requests in order to meet the overall deadline for the execution of the requests of the job as a whole, wherein the database system further manages the execution of the requests of the job as a whole by:
    at a first stage of the job,
        receive, from an optimizer, a resource estimate for a particular one of the plurality of requests;

predict resource estimates of remaining requests of the plurality of requests based on the received resource estimate;

monitor execution of the particular one of the plurality of requests for actual consumption of resource; and at a subsequent stage of the job, adjust the resource estimates of the remaining requests based on comparing the actual consumption of the resource by the particular one of the plurality of requests with the received resource estimate from the optimizer and determining that the resource estimates of the remaining requests are insufficient to meet the overall deadline of the job.

\* \* \* \* \*